(No Model.)

G. J. SCOTT.
VELOCIPEDE.

No. 598,819. Patented Feb. 8, 1898.

Witnesses
J. G. Hinkel
M. J. Warrener

Inventor
Gordon J. Scott
By Watson & Watson, Attorneys

UNITED STATES PATENT OFFICE.

GORDON JOHN SCOTT, OF PHILADELPHIA, PENNSYLVANIA.

VELOCIPEDE.

SPECIFICATION forming part of Letters Patent No. 598,819, dated February 8, 1898.

Application filed May 4, 1897. Serial No. 634,994. (No model.)

*To all whom it may concern:*

Be it known that I, GORDON JOHN SCOTT, a citizen of the United States, residing at Philadelphia, in the county of Philadelphia and State of Pennsylvania, have invented certain new and useful Improvements in Velocipedes, of which the following is a specification.

This invention relates to an improved means of propelling velocipedes and other vehicles which are usually operated by the rider.

The object of the invention is to provide means for driving the vehicle at varying rates of speed according to the variation in grades without the use of changeable gearing or the necessity for altering the speed of the pedals. With an ordinary velocipede, unless it is equipped with a speed reducing and multiplying device of some kind, variations in speed can only be attained by increasing or decreasing the speed of the pedals, and with an ordinary gear upon a level road the speed is limited by the inability of the rider to turn the cranks at a very high rate notwithstanding he may have the strength to propel the vehicle at the higher speed with a higher gear. In other words, even though the rider were doing no work there is a limit to the speed at which he is able to turn the cranks. By my improvements the crank speed may be kept uniform, while the velocipede may vary in speed automatically according to the grade of the road, and upon level roads very high speeds may be attained with a moderate speed of the crank-shaft.

In carrying out my invention I mount upon the frame of the velocipede a small series-wound dynamo which is driven by a pulley or sprocket-wheel upon the crank-shaft, and I connect this dynamo by suitable circuits to a series-wound electric motor, also mounted upon the velocipede and geared to one or more of the driving-wheels.

Figure 1:
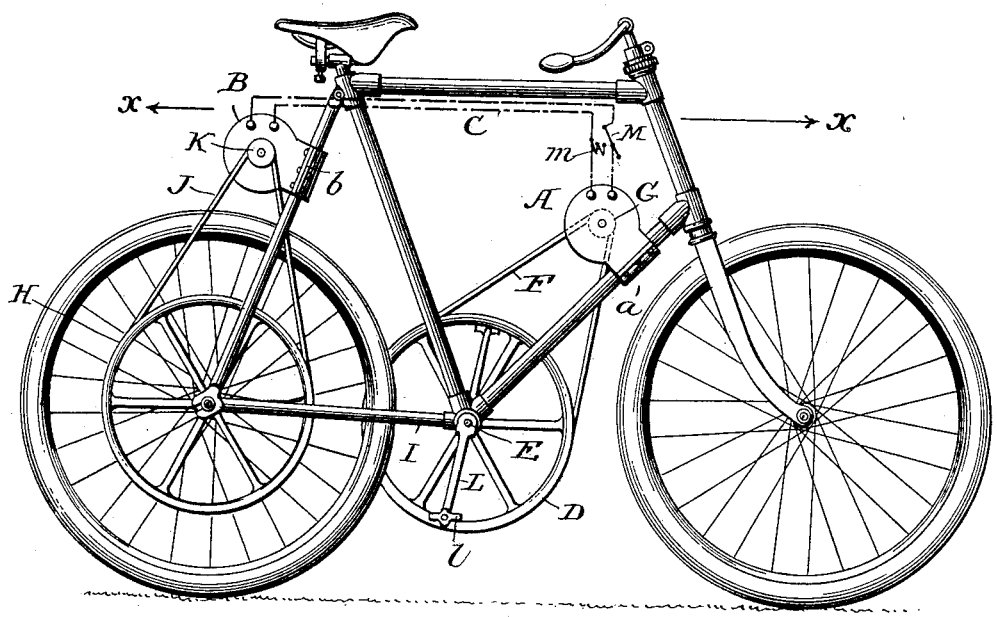
Figure 2:
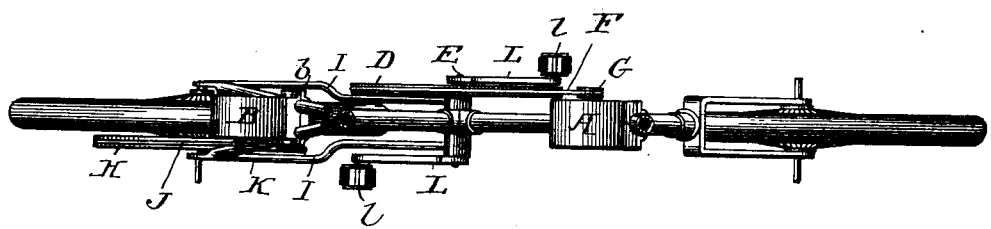
Figure 3:
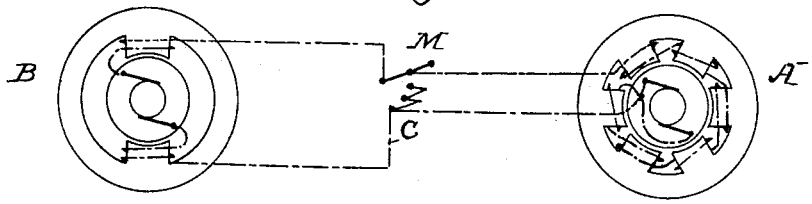

In the accompanying drawings, which illustrate my invention, Figure 1 is a side view of a bicycle provided with my improvements, and Fig. 2 is a sectional plan view on the line *x x* of Fig. 1. Fig. 3 is a diagram of the dynamo and motor circuits and connections.

In the drawings, A indicates a dynamo secured to the forward part of the bicycle-frame by a suitable clamp *a*, and B indicates a motor secured to the rear fork of the machine by a clamp *b*. The dynamo and motor are electrically connected by a suitable circuit C. A large pulley D is mounted upon the crank or driving-shaft E and is connected by a flexible belt or chain F to a small pulley G upon the dynamo. The driving-shaft is provided with the usual cranks L and pedals *l*. A large pulley or sprocket-wheel H is secured to the hub of the rear wheel of the bicycle within the rear fork I. This pulley is connected by a belt or sprocket-chain J to a small driving-pulley K upon the motor. I prefer to use a series-wound motor, for the reason that its speed varies inversely as the load, while the torque or rotary effort varies directly with the load, and hence it adapts itself automatically to the grades and quality of the road.

In the circuit C at a point convenient to the rider I place a switch M, arranged to interrupt the circuit between the motor and dynamo and, if desired, to close the circuit upon the motor, so that when coasting the motor will generate current and act as a brake upon the wheel. The switch is arranged with suitable graduated resistances *m*, so that this braking power may be regulated.

The operation is as follows: When the armature of the dynamo is driven by the rotation of the pulley D, a current will be generated and transmitted through the circuit C to the motor B. The armature of the latter will thereby be set in rotation and the rear wheel will be driven by the belt J. The motor being series-wound its speed will vary inversely as the load which is to be overcome, and hence with a constant dynamo speed and crank speed a variable speed is transmitted to the bicycle, which speed will depend upon the grade.

While I have described my invention in connection with a series-wound motor and dynamo, I do not wish to be limited thereto, as the speed may be varied automatically by compound-wound machines or auxiliary devices which are well known to those skilled in electrical matters. The manner of gearing the motor and dynamo to the working parts of the vehicle may also be varied.

What I claim, and desire to secure by Letters Patent, is—

1. The combination with a vehicle having driving-pedals and a driving-wheel, of a dynamo upon the vehicle and operated from the pedals, an electric motor upon the vehicle and in circuit with the dynamo, and a connection between the motor and the driving-wheel for rotating the latter, substantially as described.

2. The combination with a vehicle having driving-pedals and a driving-wheel, of a dynamo upon the vehicle and operated from the pedals, a series-wound electric motor upon the vehicle and in circuit with the dynamo, and a connection between the motor and the driving-wheel for driving the latter, substantially as described.

3. The combination with a velocipede having a frame, crank-shaft, cranks, pedals, and a driving-wheel, of a pulley upon the crank-shaft, a dynamo upon the frame and conneced with said pulley, a series-wound electric motor mounted on the frame and in circuit with the dynamo, a pulley connected with the driving-wheel, and a connection between the motor and said latter pulley, substantially as described.

4. The combination with a vehicle having driving-pedals and a driving-wheel, of a series-wound dynamo upon the vehicle and operated from the pedals, a series-wound electric motor upon the vehicle and in circuit with the dynamo, and a connection between the motor and the driving-wheel for driving the latter, substantially as described.

In testimony whereof I affix my signature in presence of two witnesses.

GORDON JOHN SCOTT.

Witnesses:
BENSON MANN,
SAMUEL McDOWELL.